Figure 1:
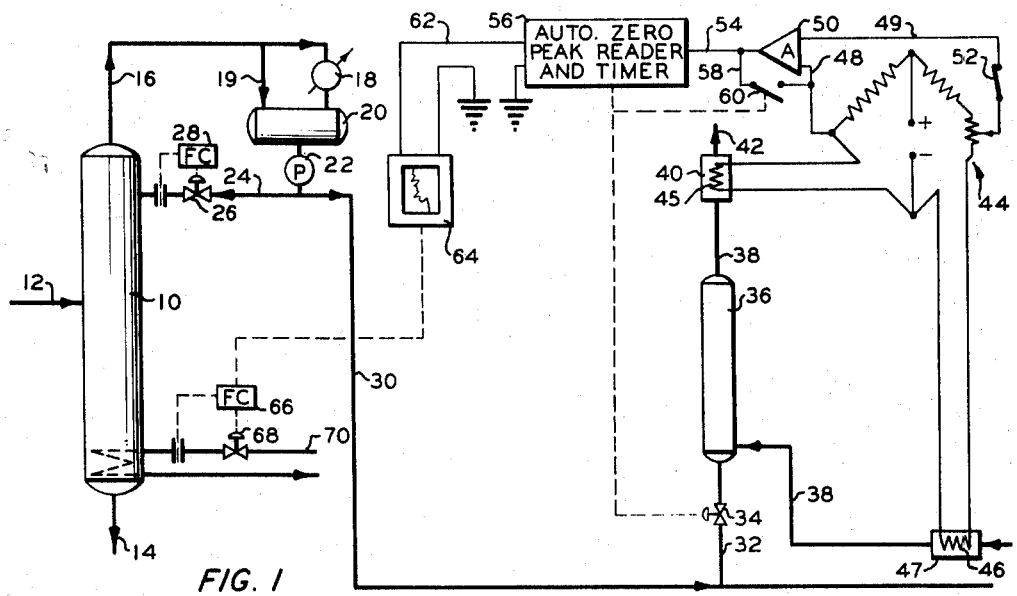

April 26, 1966      M. C. BURK      3,247,703

AUTOMATIC ZEROING SYSTEM

Original Filed Dec. 3, 1958      3 Sheets-Sheet 1

INVENTOR.
M.C. BURK

BY Young & Quigg

ATTORNEYS

INVENTOR.
M.C. BURK

BY

*Young & Young*

ATTORNEYS

April 26, 1966  M. C. BURK  3,247,703
AUTOMATIC ZEROING SYSTEM
Original Filed Dec. 3, 1958  3 Sheets-Sheet 3

INVENTOR.
M.C. BURK
BY
ATTORNEYS

United States Patent Office 3,247,703
Patented Apr. 26, 1966

3,247,703
AUTOMATIC ZEROING SYSTEM
Marvin C. Burk, Bartlesville, Okla., assignor to Phillips Petroleum Company, a corporation of Delaware
Original application Dec. 3, 1958, Ser. No. 777,995, now Patent No. 3,094,862, dated June 25, 1963. Divided and this application May 20, 1963, Ser. No. 281,717
8 Claims. (Cl. 73—23.1)

This invention is a division of my copending application Serial No. 777,995, filed December 3, 1958, and entitled "Improved Chromatographic Analyzer Peak Reader," now U.S. Patent 3,094,862, said application being a continuation-in-part of my Patent 3,069,895, filed April 10, 1958, and entitled "Chromatographic Analyzer Peak Reader." The instant invention relates to improvements in automatic zeroing apparatus. Ine one aspect the instant invention relates to improved means for automatically zeroing a bridge network. In another aspect the invention relates to means for rebalancing a network in a chromatographic analyzer.

As described in my Patent 3,069,895 and herein, the electrical signals produced by the chromatographic analyzer are obtained from a Wheatstone bridge. This bridge has certain elements which tend to drift or become inaccurate as times goes by. The instant invention also provides a novel means for compensating for this bridge drift. The operation of correcting for drift is termed "zeroing." In the instant apparatus, means are provided to detect the bridge unbalance at a time when no peak is being read. The signal that represents the unbalance is passed to a phase inverter, to a memory circuit, and then is applied back into the bridge. The effect of this is to provide a continuous bias to the bridge which is opposite and of substantially equal magnitude to the unbalance signal produced. This automatic zeroing operation and the equipment therefor is cooperatively arranged with the peak reader as described in greater detail hereinbelow.

The advantages of this cooperative arrangement are that a rugged system is obtained that has fewer precision moving parts and fewer precision elements such as potentiometers and comparing circuits. The instant invention is also designed to take advantage of new developments that permit higher speed chromatographic analyses; some of the more recent developments in the chromatographic column have provided apparatus that is capable of analyzing the sample in 3 to 5 minutes, or even less. Some of these high speed analyzers have a plurality of packed columns with suitable valving to sequentially admit samples of material to respective columns.

It is an object of this invention to provide an improved automatic zero apparatus for use in an automatic chromatographic analyzer. It is another object of this invention to provide an improved automatic zero apparatus which is rugged, has simplified circuitry, and has fewer moving parts. It is still a further object of this invention to provide an improved automatic zero apparatus for use in cooperation with an improved peak reader as herein described. An object is also to provide improved apparatus suitable for cooperating with high speed chromatographic analyzers. Other objects and advantages will become apparent from the following disclosure.

Figure 4B:
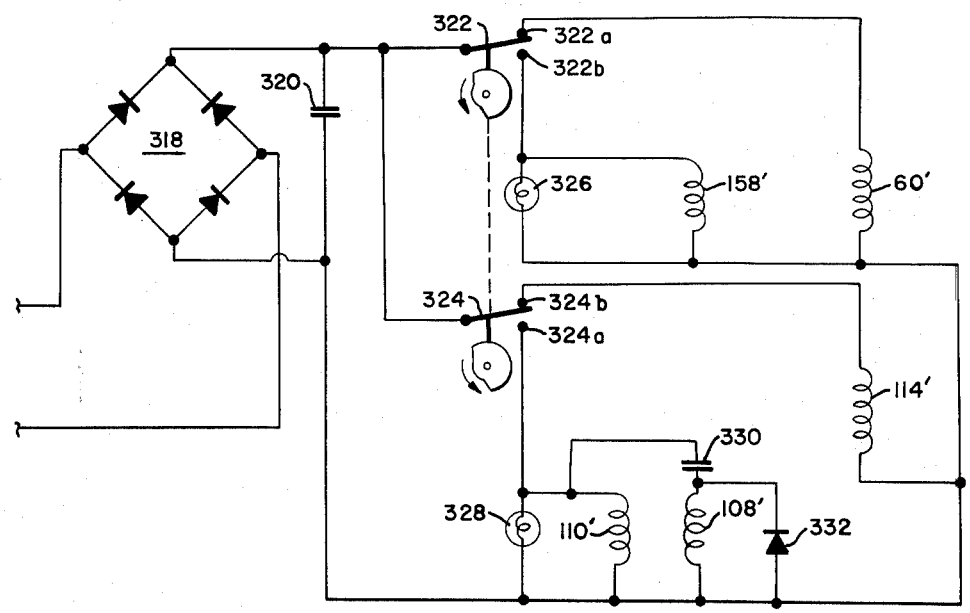
Figure 2:
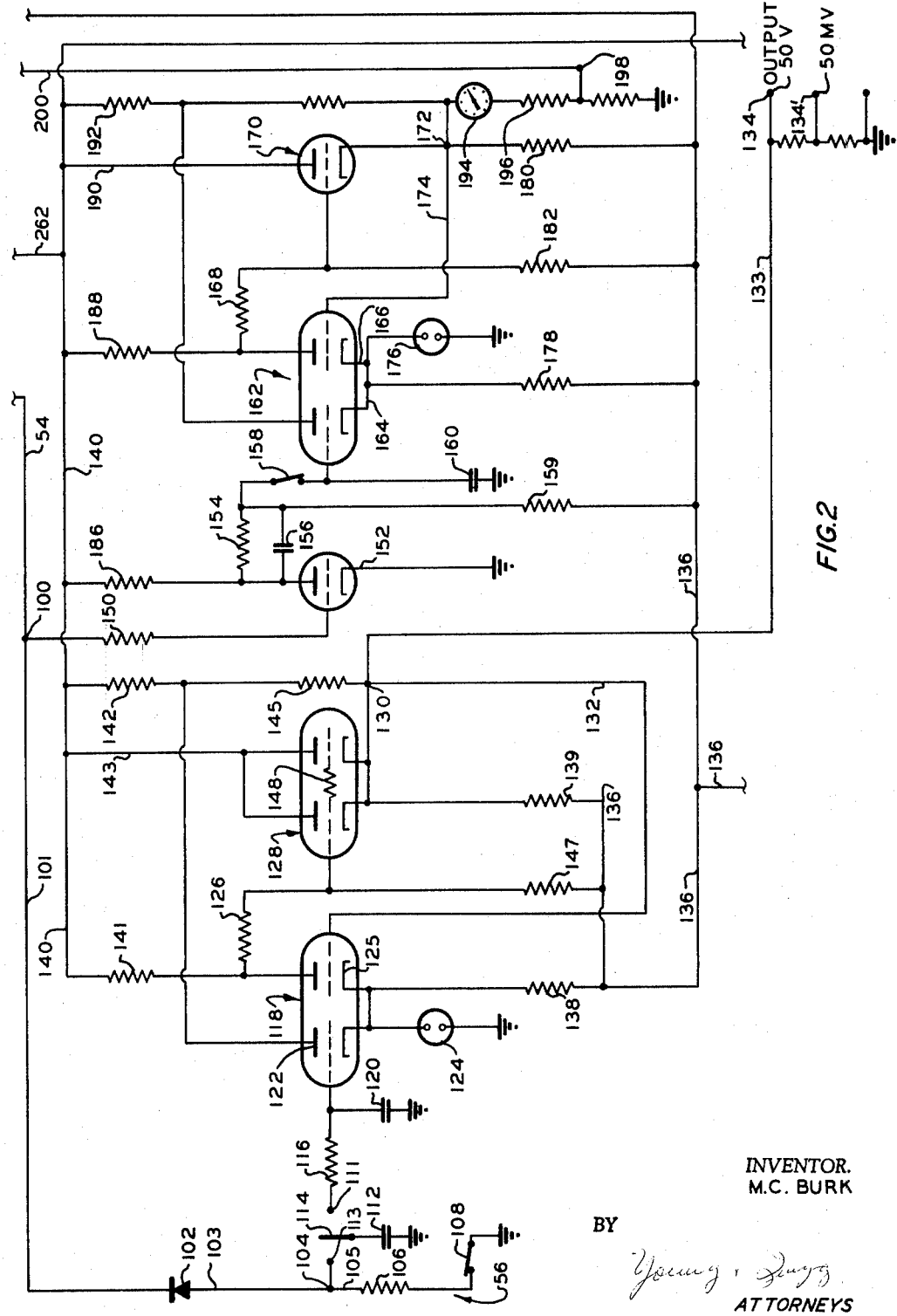
Figure 4A:
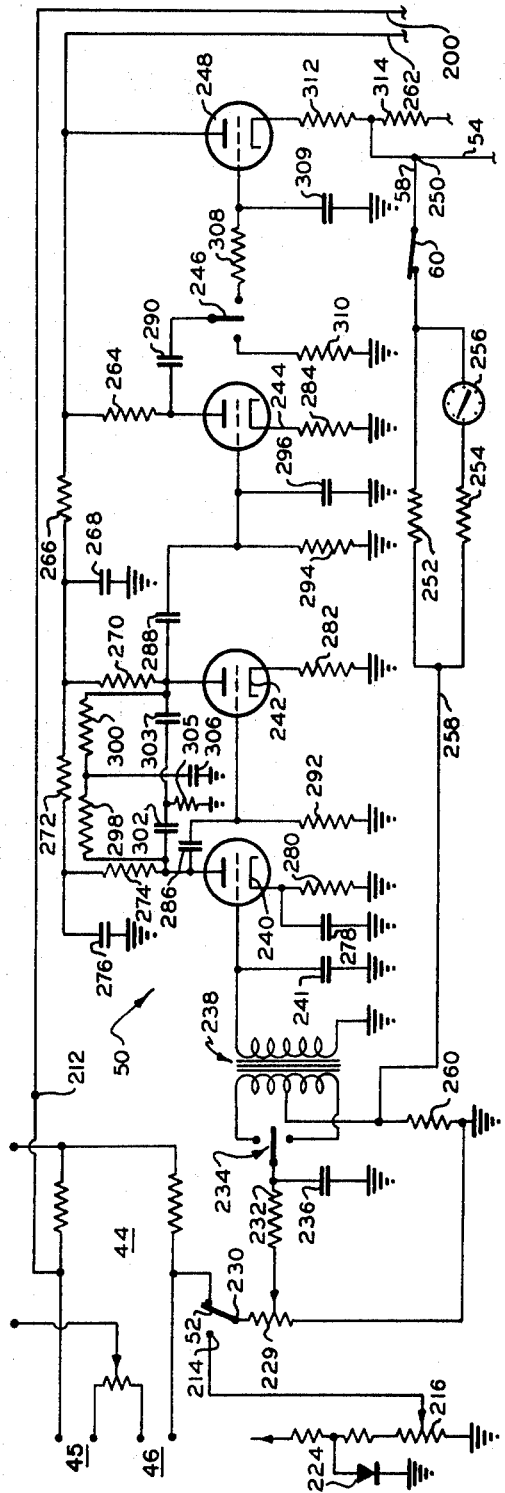
Figure 3:
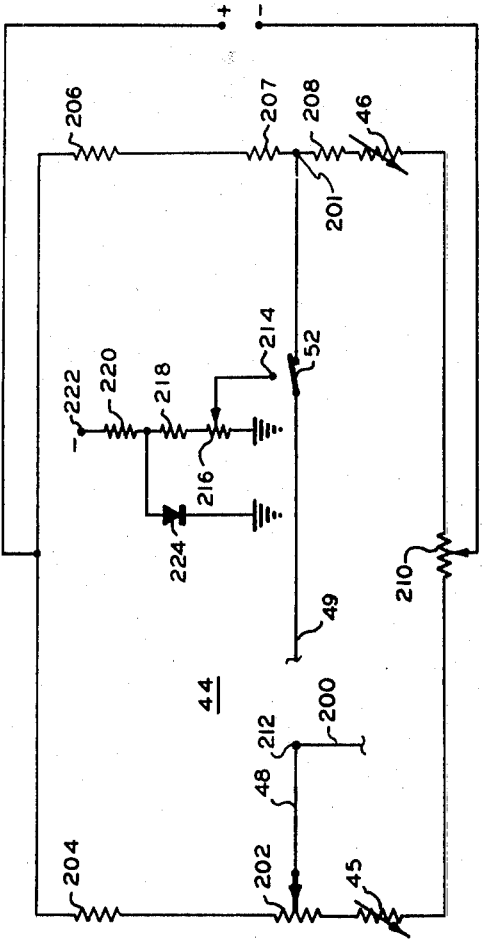

In the drawings:
FIGURE 1 shows schematically the peak reader timer and automatic zero of the instant chromatographic analyzer as applied to the control of a fractionation unit;
FIGURE 2 shows a cooperative arrangement of a single peak reader and an automatic zero apparatus;
FIGURE 3 shows a Wheatstone bridge which is zeroed by the instant zero apparatus;
FIGURE 4A shows schematically an amplifier suitable for use with the instant invention;
FIGURE 4B shows schematically the zero and gate control circuits for use with a single peak reader.

As used herein the term "gate" is a period of time during which the peak reader of the instant invention is in operation to produce a signal representative of the maximum value generated by selected component as it pasess through the fluid handling portion of the analyzer. "Peak," for the purpose of this invention, may be defined as the maximum signal received during the gate. "Cycle time" is the period of time required to carry out a desired analysis of a particular sample. "Zero" represents the act of, and interval of time for, compensating the bridge for drift. A "memory circuit" is an apparatus to which a peak is transferred after having been read.

FIGURE 1 shows a fractionator 10 which comprises a portion of a depropanizer. A feed of natural gas liquids, comprising propane through nonanes, primarily, that is, $C_3$ through $C_9$'s, is provided through conduit 12. A kettle product stream comprising $C_5$'s and heavier is withdrawn through conduit 14. An overhead line 16 conducts what is primarily propane and butane through a condenser 18 and condenser bypass 19 to an accumulator 20. A liquid pump 22 assist in pressurizing the liquid withdrawn from the accumulator. A reflux line 24 returns reflux to the column under the control of a valve 26 which is regulated by flow controller 28. The overhead liquid product passes out through conduit 30.

A sample is withdrawn from the line 30 through a conduit 32 by means of a sampling valve 34 which is controlled by a timer. The sample passes through the valve into the chromatographic column 36 from whence it is eluted by a stream of carrier gas, such as helium, which is admitted through the conduit 38, and which may, if necessary, have a carrier gas valve (not shown) as part of the system. Such a valve would operate cooperatively with the valve 34 and be controlled by the timer. It is preferred to employ a column having a constant flow of carried gas, which requires only a pressure regulator and/or a flow controller instead of a timer-operated valve. The gas mixture eluted from the column passes through a conduit 38 to a sample cell 40, thence is vented through 42.

A Wheatstone bridge 44 has thermistors, or other temperature sensitive elements 45 and 46, in respective branches thereof and disposed, respectively, in sample cells 40 and 47 (the latter being for obtaining a carrier gas reference signal). Leads 48 and 49 conduct the output signals from the bridge to an amplifier 50. A manually operated switch 52 is disposed in lead 49 for purposes which will be hereinafter explained with respect to FIGURE 4A.

The amplifier 50 feeds its output signal through lead 54 into the apparatus 56 designated schematically as the automatic zero, peak reader, and timer. A feedback circuit 58 having a switch 60 controlled by the timer portion of apparatus 56 is associated with the amplifier 50. The particular peak selected by and read by the peak reader is fed through the lead 62 to a recorder controller 64. In the embodiment shown, the peak reader is sensitized to read isopentane out of the mixture of hydrocarbons sent into the column 36 that appear in the overhead product stream in conduit 30. This peak is used to actuate a flapper valve, or appropriate transducing or electrical apparatus in recorder controller 64.

The signal from recorder controller 64 is transmitted by appropriate means to reset a flow controller 66 which normally controls the flow of steam or other heating medium to the fractionator. The flow controller 66 in turn adjusts the position of a control valve 68 disposed in the steam conduit 70.

In FIGURE 2 the output signal from the amplifier 50 appears on the lead 54 and is transmitted to the common terminal 100 of the automatic zero and peak reader assembly 56. From this terminal a lead 101 conducts signals to the peak reader—and conducts them first to a rectifier (or diode as in my Patent 3,069,895) 102. A lead 103 connects the other terminal of the rectifier to a junction 104. A lead 105 connects the junction to a resistor 106, the other terminal of which is connected to ground or other suitable source of potential through a reset switch 108.

A double acting switch 114 is disposed for operation between contacts 111 and 113. A capacitor 112 is connected at one terminal to the switch 114 and at the other terminal thereof to ground. One terminal of resistor 116 is connected to contact 111 and the other terminal of 116 is connected to the input terminal of a differential amplifier 118. A memory circuit comprising a second capacitor 120 is connected between this input of the amplifier and ground.

The control grid of a cathode follower 122 comprises the input terminal of the differential amplifier 118. The cathode of this cathode follower is connected by a voltage regulator 124 (a neon tube or the like) to ground and is also connected to the cathode of a triode 125. The anode of 125 is connected through a resistor 126 to the control grid of a power stage triode 128. In the embodiment shown a double triode is provided, although, if desired, a single triode may be employed. This power stage is also a cathode follower and its output appears at the junction 130. A feedback circuit through lead 132 connects junction 130 to the control grid of the triode 125. A lead 133 connects the junction 130 to the output terminals 134 of the differential amplifier. If desired, the output signal can be attenuated by appropriate resistors and applied through similar terminals 134'. The larger output signal is desired for pneumatic controllers, whereas the smaller one is desired for electrical controllers. A lead 136 provides negative rectified D.C. to the cathodes of the triodes 122, 125 and cathode follower 128 through the resistors 138 and 139. A lead 140 provides positive voltage to the anodes of triodes 125 and 122 through respective resistors 141 and 142. A lead 143 applies voltage to the anodes of the cathode follower 128. A resistor 145 is disposed between the resistor 142 and the junction 130. A resistor 147 is disposed between the lead 136 and the control grid of cathode follower 128. A resistor 148 is disposed between the respective control grids.

The zeroing circuit comprises a resistor 150 that connects the input terminal 100 to a phase inverter 152. The anode of the phase inverter is connected through parallel connected resistor 154 and capacitor 156 to a normally open switch 158. A resistor 159 cooperates with 154 to form a voltage divided and permits the charge on 160 to reduce itself to the level of the phase inverter when the charge is greater than the inverter output. The switch 158 is connected to a capacitor 160 which comprises the memory unit of the zero circuit. The voltage stored on the capacitor 160 is applied to the differential amplifier 162 which is similar to 118.

The differential amplifier comprises an input terminal at the grid of a cathode follower 164, the output of which is connected to a triode 166. The output of the triode 166 is applied through a resistor 168 to the control grid of another cathode follower 170 (which could be a double triode such as 128 and 118). The output from 170 appears at a junction 172. A feedback circuit through lead 174 applies the output signal to the control grid of the triode 166. A neon tube voltage regulator 176 is connected between ground and the cathodes of 164 and 166.

Negative bias is applied to the cathodes of 164 and 166 from the lead 136 through the resistor 178. Similarly negative bias is applied to the cathode of 170 through the resistor 180. Resistor 182 connects the control grid of 170 to the lead 136. Positive voltage, derived from rectified alternating current, is applied to the anodes of the phase inverter and the differential amplifier through resistors 186 and 188. A lead 190 provides anode voltage to the cathode follower 170. Positive voltage is supplied to the anode of cathode follower 164 across a resistor 192.

The output of the zero circuit is applied from junction 172 to one terminal of the galvanometer 194, thence through a resistor 196 to an output terminal 198. The signal appearing at 198 is then applied to the bias terminal of the bridge to automatically zero it as hereinafter described with reference to FIGURE 3. A lead 200 connects the output terminal 198 of the automatic zero circuit to the bridge 44.

In lieu of 152, a phase-reversing amplifier could be used in combination with the switch and memory of this zero circuit. However, the number of circuit elements between the memory (capacitor 160) and the bridge would be increased and thus gives poorer stability than the instant arrangement.

In FIGURE 3 there is shown a bridge of the type associated with the instant invention. In addition to the elements 45, 46 and leads 48, 49 which have already been enumerated, the bride includes an output terminal 201, a manually operated voltage divider 202 and a resistor 204 in series with the thermistor 45 and disposed therebetween with the positive terminal of the bridge. A resistor 206, preferably of the same size as 204, and balancing resistors 207 and 208 are disposed in series between the positive terminal of the bridge and the thermistor 46. A voltage divider 210 is provided at the negative terminal of the bridge. Terminal 201 and switch 52 are shown disposed in the lead 49 which eventually connects to the amplifier 50. A bias terminal 212 is provided in lead 48 to which the lead 200 from the automatic zero circuit connects. This bias terminal, for all practical purposes, comprises an additional input to the bridge so that the bridge is biased back into balance rather than having a voltage divider positioned by a servomotor responsive to unbalance, as shown in my Patent 3,069,895.

In FIGURES 3 and 4A there is also shown a circuit arranged for cooperation with switch 52 to enable manual adjustment of the bridge span. In this circuit, a potentiometer contactor 214 is arranged to connect with the switch 52 (the latter being a double throw switch). Contactor 214 is a part of the potentiometer 216 which is arranged with resistors 218 and 220 and a source of negative potential 222. A Zener diode 224 is connected between the resistors 218 and 220 and ground. The switch 52 is normally closed, maintaining the lead 49 connected to the bridge terminal 201. In order to adjust the bridge span, the switch 52 is moved into contact with 214, then the original measurement (e.g. analysis) is set on potentiometer 216. The desired reading is then set on potentiometer 229. The span is now adjusted. This arrangement permits synthesizing a peak signal so that adjustments can be made during operation.

In FIGURE 4A are shown the details of an amplifier 50, such as used in the combination shown in FIGURE 1. An adjustable resistor 229 is disposed between the amplifier input terminal 230 (connected to bridge terminal 201 through lead 49) and ground. The resistor contactor is connected in series with another resistor 232 which is in turn connected in series with a chopper 234. A capacitor 236 is disposed between the latter two elements and ground. It must be remembered that a D.C. signal is supplied from the bridge, therefore, it is desired to chop in order that transforming and further amplification can take place efficiently. After the chopper is a transformer 238, the secondary of which is connected between ground and the control grid of a triode 240, this grid being grounded through a capacitor 241. The anode of 240 is connected to the control grid of a second triode 242, and similarly 242 is connected to a third triode 244. The output from 244 is connected to a chopper 246, which is, in turn connected in series with a power stage tube 248. Tube 248 is a cathode follower, the output of which appears at the amplifier output terminal 250. The lead 54 is connected to the output terminal 250 and conducts the amplifier bridge signal to the peak reader and the zero circuit input terminal 100. The feedback circuit 58 (FIGURE 1) is also provided, and has herein the resistor 252 connected in parallel with the series circuit of another resistor 254 and the galvanometer 256. A lead 258 connects the normally closed switch 60 and parallel circuit of the feedback to the primary of the transformer 238. A resistor 260 connects the primary of the transformer to ground.

A lead 262 is connected to a lead 140 which, as above explained, is connected to a source of positive potential. Lead 262 applies positve voltage to the anode of tube 248, and through the resistor 264 to the anode of the tube 244. Resistor 266 drops the potential to a lower value to be applied to triode 242. Condenser 268 is a decoupling condenser to prevent one tube from feeding another through the plates. Similarly, after passing through a resistor 272 the positive voltage is then applied through a resistor 274 to the anode of the triode 240. A decoupling condenser 276 connects the plate circuit of tube 240 to ground. A parallel circuit comprising a capacitor 278 and a resistor 280 connects the cathode of 240 to ground. Resistors 282 and 284 connect the cathodes of triodes 242 and 244, respectively to ground. Capacitors 286, 288 and 290 are disposed in series between the outputs of tubes 240, 242, and 244, respectively, and the next succeeding item of equipment. A resistor 292 connects the control grid of the triode 242 to ground. An RC circuit comprising a resistor 294 and a capacitor 296, connected in parallel with each other, connects the control grid of the tube 244 to ground. When I refer to ground I also mean a suitable source of potential.

A band elimination circuit is disposed between the anodes of tubes 240 and 242. This circuit is designed to reject noise which may appear through the ground connections and is described in FIGURE 4 of U.S. Patent 2,833,928. It aids in giving maximum amplification. The band elimination circuit comprises a resistor 298 connected in series with a resistor 300 and a capacitor 302 connected in series with capacitor 303. The respective series connections are arranged in parallel with each other. A resistor 305 is connected between ground and a junction disposed between the capacitors 302 and 303. A capacitor 306 is connected between ground and a junction between the resistors 298 and 300.

An RC filter comprising a resistor 308 and the capacitor 309 is disposed in series between one contactor of the chopper 246 and the power stage 248. The other contact of the chopper is connected to ground through a resistor 310. A resistor 312 is disposed between cathode follower 248, which is the power stage and the output terminal 250. Having a common junction with 312 and 250 is a resistor 314 which is connected to a source of negative potential to bias the tube 248.

FIGURE 4B illustrates the power supply in the form of zero and gate actuating circuits. In substance, these circuits comprise two parallel circuits each actuated by their own timer operated cam. In FIGURE 4B prime numbers represent the elements which actuate those with like numbers in previously described figures. A separate cam or cams if plural columns are used provide power to the sampling valves 34, as illustrated in FIGURE 1. The sampling valves 34 each require a separate cam. Preferably the cams are mounted on a shaft that is rotated by a synchronous motor.

In FIGURE 4B a rectifier 318 has a capacitor 320 connected across its output terminals. Transformed A.C. from the cathode heater circuit is applied to the input terminals. One lead of the rectifier is connected to timer operated switch contactors 322 and 324, both of which operate between two contacts. In the zero circuit a coil 60', for opening the switch 60 of FIGURE 1 is connected in series with the contact 322a. The other side of 60' is connected to the rectifier. Also in the zero circuit a coil 158' for closing switch 158 (FIGURE 2) and an indicating light 326 are connected in parallel between the contact 322b and the rectifier. In series with the contact 324b is a coil 114' for actuating the switch 114 of FIGURE 2. In series with the contact 324a is a parallel circuit comprising an indicating light 328, a relay coil 110', and a capacitor 330 connected in series with a relay coil 108'. A rectifier 332 is connected between the capacitor 330 and in parallel with the coil 108'.

The operation of the apparatus of FIGURE 1 will now be described. It is assumed that a feed stream such as natural gas liquids is supplied to the tower through column 12 and an overhead product stream is obtained therefrom which passes out through the conduit 30. Steam is being supplied through the conduit 70 under the control of the valve 68. Switch 52 is closed to complete the bridge-amplifier circuit. In summary, the timer opens the sampling valve 34 for a predetermined time and permits a measured sample of a given size to be placed in the column 36. If required, the timer then admits carrier gas through the conduit 38 into the column and it begins to elute the components of the sample. The bridge is unbalanced by the changes in the resistance of the thermistors 45 and 46 responsive to changes in the respective fluids flowing past them. Primarily, the changes in resistance 45 produce the peaks which represent the various components of the mixture, such as propane, butane, and isopentane.

Referring now to FIGURES 2, 4A and 4B, the first (or last, as shown in my Patent 3,069,895) operation to take place in the peak reader is the zeroing of the bridge. This should take place at a time when no component within the column is being eluted, but while carrier gas is admitted. The timer moves the contact 322 against contact 322b which causes the switch 60 to open and the switch 158 to close. If there is unbalance in the bridge the signal is applied to the amplifier 50 appearing thereat at terminal 230 where it is then chopped, amplified and again chopped and applied to the input terminal 100 of the zero circuit. This signal represents unbalance in the bridge and is then applied to the control grid of the phase inverter 152. The signal out of 152 then passes through the differential amplifier 162 and appears at the output terminal 198 of the zero circuit where the signal is of opposite polarity and of a substantially equal magnitude to the signal appearing at the input terminal of amplifier 50.

This bridge-biasing signal is then applied to the bias terminal 212 of the bridge, as shown in FIGURE 3. This should rebalance the bridge so that there is no substantial unbalance sensed in it. The memory circuit 160 (FIGURE 2) continuously supplies a balancing bias to the bridge. If the bridge has become so unbalanced that manual balancing is necessary, this will be indicated on the galvanometer 194 of FIGURE 2 and the operator can then adjust the voltage divider 202 to appropriately compensate for this. The effect of manual adjustment, of course, is to reduce the magnitude of the unbalance in the bridge, hence the magnitude of the biasing signal applied thereto from the zero circuit. The reason I use the terms "substantially equal magnitude" and "no substantial unbalance" is in recognition that manufacturing tolerances and aging of circuit elements in service may present 100 percent bridge balance, the same as it would in any system, and the system characteristic that requires unbalance to operate, thereby to approach zero, but not to reach zero in order to maintain the necessary unbalance to operate.

Now that the bridge is zeroed the timer moves the switch 322 against the contact 322a, returns the switch 60 to closed position, opens 158, and thus prepares the circuit for reading out a peak. In the depropanizer of FIGURE 1, for example, having the chromatographic analyzer sensitized for reading out the peak of isopentane, when the isopentane peak is about to appear, the timer moves the contactor 324 (FIGURE 4B) against the contact 324a to thereby open the gate. When this occurs current passes through the coil 110' and almost simultaneously therewith the capacitor 330 charges, thus actuating the coil 108'. The effect of these events is to connect switch 114 to terminal 113 and close the reset switch 108, the latter momentarily. The momentary closing of 108 allows discharging of the capacitor 112 of FIGURE 2, thus "erasing" any charge stored thereon, and permitting it to build up a completely new charge from the new signal being applied thereto. While the peak is being generated, a signal is passed and a charge is built up on capacitor 112.

When the maximum point of the peak passes, the charge of 112 prevents any further signal from passing the rectifier 102, and the rectifier will not permit leaking of the charge on 112 back into the circuit. At some time after the maximum charge has been stored in 112 the timer moves the contactor 324 against 324b which actuates the switch 114 from contact 113 to contact 111. When the switch 114 is connected to contact 111, the charge is transferred from the capacitor 112 to the memory circuit, that is, the capacitor 120. The charge on 120 is then applied to the differential amplifier 118, the output signal of which appears at terminal 134 or 134', as the case may be. The output signal is then transmitted on lead 62 (FIGURE 1) to the recorder controller 64 which produces an output signal, either pneumatic or electrical which is applied to the flow controller 66. The flow controller is reset responsive to this and the motor valve 68 moves to a new control position. In the preferred embodiment, if too much isopentane appears, as indicated by the peak, the amount of steam is cut back. Since the timer is a continuously operating device, such as synchronous motor driving the cams, the above steps are repeated.

It should be evident that the instant invention includes a greatly simplified peak reader having the advantage of fewer moving parts as is exemplified by the fact that the timer necessary to operate FIGURE 1 only needs three cams—one cam for operating the valve, the zero circuit (FIGURE 4B) and the gate circuit (FIGURE 4B) respectively. In the preferred construction, all of the switches (e.g., 60, 108, 110, 114, 158) used were of the type that close responsive to application of the magnetic field (or open if that is the operation desired). It has been found desirable to employ glass enclosed switches which are, in turn, surrounded by a coil (primed coils, FIGURE 4B) in order to provide a fireproof structure which is rapidly responsive to the application of actuating force.

In addition, a novel means for zeroing a Wheatstone bridge has been devised and presented herein. This zeroing or compensating means comprises apparatus which provides a signal of opposite polarity and substantially equal magnitude to bias the bridge in the opposite direction in which its unbalance appears. In addition, the instant invention presents an improved simplified structure capable of being associated with the high speed chromatographic analyzers which have been developed, as well as being associated with those which have been available for quite some time. With obvious modifications, the various peak-reading and zero circuits of my Patent 3,069,895 can be employed in combination with any one or all of the instant peak, zero and multiple-peak reading circuits.

While the instant peak reader has been shown suitable for use with a chromatographic analyzer, it is by no means limited thereto. It can be used in combination with any analyzing instrument that provides an intermittent signal representative of a component from which it is desired to control. Such devices include mass spectrometers, ionization detectors, and those types of infrared and ultraviolet analyzers that scan a region of wave lengths. Generally, such analyzers require individual samples, i.e. are not continuous; they provide an analysis which can indicate a plurality of components; and create the problem in using them for control that one part of the analysis must be separated from other parts so that the control system can be made responsive to the proper component.

While I have shown certain examples, combinations and embodiments in the attached drawings and described them in the attached specification, it is not my intention to be limited to the specific forms illustrated and discussed, but to include as my invention all those modifications thereto which should be obvious to one skilled in the art.

I claim:

1. Apparatus for zeroing a voltage source comprising a voltage source having an output terminal and a biasing terminal; a phase inverter; a capacitor having first and second terminals; means for connecting in series at first predetermined times said output terminal, said phase inverter, and said first terminal and for breaking said series circuit at second predetermined times; means for continuously connecting said second terminal to a source potential; and means for continuously connecting said first terminal to said biasing terminal to zero said voltage source.

2. Apparatus in accordance with claim 1 wherein said voltage source comprises a bridge network.

3. Apparatus in accordance with claim 1 wherein said means for connecting and for breaking comprises a switch connected in series between said first terminal of said capacitor and said output terminal of said voltage source, and timing means for actuating said switch at said first and second predetermined times.

4. The combination comprising a bridge having an output terminal and a biasing terminal; and a means for zeroing having another input terminal and another output terminal; means for continuously connecting said another output terminal to said bridge biasing terminal; and means for intermittently connecting said bridge output terminal to said another input terminal; said means for zeroing including means for continuously producing a signal at said another output terminal that is of opposite polarity and of substantially equal magnitude to the signal most recently applied from said bridge output terminal to said another input terminal through said means for intermittently connecting, to thereby zero said bridge.

5. The combination comprising a bridge; means connected to said bridge for zeroing said bridge by receiving a signal representative of bridge unbalance and producing therefrom a bridge-biasing signal of opposite polarity and of substantially equal magnitude to the bridge unbalance, means for intermittently applying the signal representative of bridge unbalance to said means for zeroing, and means for continuously applying the bridge-biasing signal to said bridge.

6. The combination comprising a bridge having power supply terminals, first and second output terminals, and a biasing terminal disposed between said second output terminal and said bridge; a direct current power supply; means for connecting said power supply to said bridge power supply terminals; an amplifier having input terminals and an output terminal; a zero circuit comprising an input terminal, a phase inverter, a switch, a differential amplifier, and another output terminal connected in series with a capacitor connected on one side between the switch and the differential amplifier and on the other side to a source of potential; means for connecting said amplifier input terminals to said bridge output terminals; means for connecting said zero circuit input terminal to said amplifier output terminal; and means for continuously connecting said another output terminal to said biasing terminal.

7. Apparatus comprising a chromatographic column having an inlet and an outlet; means for providing a sample to said inlet; an electrical network having an element disposed in a portion of said column outlet and also having an output terminal and a biasing terminal; means for balancing said network by receiving a signal representative of network unbalanced and producing therefrom a network-biasing signal of opposite polarity and of substantially equal magnitude to the network unbalance, means for intermittently applying the signal representative of network unbalance to said means for balancing; and means for continuously applying the network biasing signal to said biasing terminal.

8. Apparatus comprising a bridge having first and second power supply terminals, first and second output terminals, and a biasing terminal disposed between said second output terminal and the remainder of said bridge; a direct current power supply; means for connecting said direct current power supply between said first and second power supply terminals; an amplifier having first and second input terminals and an output terminal; means for connecting said first and second output terminals to said first and second input terminals of said amplifier, respectively; a phase inverter having an input terminal and an output terminal; means connecting said output terminal of said amplifier to said input terminal of said phase inverter; a differential amplifier having first and second input terminals and an output terminal; a capacitor having first and second terminals; a switch; means for connecting said switch and said first terminal of said capacitor in series between said output terminal of said phase inverter and said first input terminal of said differential amplifier; means connecting said second terminal of said capacitor to a source of potential; means for actuating said switch to an open position at first predetermined times and for actuating said switch to a closed position at second predetermined times; a cathode follower having an input terminal and an output terminal; means connecting said output terminal of said differential amplifier to said input terminal of said cathode follower; means connecting said output terminal of said cathode follower to said second input terminal of said differential amplifier; and means for continuously connecting said output terminal of said cathode follower to said biasing terminal.

References Cited by the Examiner
UNITED STATES PATENTS

| 2,565,230 | 8/1951 | Hebler | 73—27 |
| 2,715,209 | 8/1955 | Williams et al. | 73—24 |

LOUIS R. PRINCE, *Primary Examiner.*

RICHARD QUEISSER, *Examiner.*